(12) United States Patent
Lou

(10) Patent No.: US 9,337,944 B1
(45) Date of Patent: *May 10, 2016

(54) DIGITAL FM STEREO RECEIVER ARCHITECTURE

(71) Applicant: Marvell International Ltd., Hamilton (BM)

(72) Inventor: Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 457 days.

This patent is subject to a terminal disclaimer.

(21) Appl. No.: 13/800,215

(22) Filed: Mar. 13, 2013

Related U.S. Application Data

(63) Continuation of application No. 12/170,224, filed on Jul. 9, 2008, now Pat. No. 8,406,717, which is a continuation of application No. 10/819,649, filed on Apr. 6, 2004, now Pat. No. 7,406,302.

(60) Provisional application No. 60/531,302, filed on Dec. 18, 2003, provisional application No. 60/529,656, filed on Dec. 15, 2003.

(51) Int. Cl.
*H04B 1/16* (2006.01)
*H04H 40/36* (2008.01)
*H04H 40/45* (2008.01)
*H04H 20/48* (2008.01)

(52) U.S. Cl.
CPC .................................... *H04H 20/48* (2013.01)

(58) Field of Classification Search
CPC ......... H04B 1/16; H04H 40/45; H04H 40/36; H04H 40/81

USPC ......... 455/205, 208, 211, 214, 216, 258, 260, 455/263, 334; 381/2, 3, 12, 22
See application file for complete search history.

(56) References Cited

U.S. PATENT DOCUMENTS

| | | | |
|---|---|---|---|
| 4,550,423 A | 10/1985 | Naito | |
| 4,680,793 A | 7/1987 | Sugai et al. | |
| 4,817,151 A | 3/1989 | Bod et al. | |
| 4,860,354 A | 8/1989 | Van Roermund | |
| 5,327,132 A * | 7/1994 | Whitecar et al. | 341/141 |
| 5,357,574 A | 10/1994 | Whitecar | |
| 5,404,405 A | 4/1995 | Collier et al. | |
| 5,561,849 A | 10/1996 | Mankovitz | |
| 5,920,632 A | 7/1999 | Lubbe et al. | |
| 6,694,026 B1 | 2/2004 | Green | |

(Continued)

OTHER PUBLICATIONS

Recommendation ITU-R BS. 450-3, "Transmission Standards for FM Sound Broadcasting at VHF", (1982-1995-2001), The ITU Radiocommunication Assembly.

(Continued)

*Primary Examiner* — Blane J Jackson

(57) ABSTRACT

Systems and techniques for digital processing of FM stereo signals are described. According to an aspect, a method includes determining whether a received digital signal is a mono signal or a stereo signal, using a digital signal processor to process the received digital signal based on stereo transmission when the received digital signal is determined to be a stereo signal, and using the same digital signal processor to process the received digital signal based on mono transmission when the received digital signal is determined to be a mono signal.

23 Claims, 4 Drawing Sheets

(56) References Cited

U.S. PATENT DOCUMENTS

| | | |
|---|---|---|
| 6,714,651 B2 | 3/2004 | Yamamoto |
| 6,901,146 B1 * | 5/2005 | Taura et al. ............... 381/3 |
| 7,079,657 B2 | 7/2006 | Wu et al. |
| 7,092,460 B1 * | 8/2006 | Wildhagen ............... 375/327 |
| 7,181,018 B1 * | 2/2007 | Green ............... 381/2 |
| 7,295,631 B2 * | 11/2007 | Wildhagen ............... 375/316 |
| 2003/0087618 A1 | 5/2003 | Li et al. |
| 2004/0101143 A1 | 5/2004 | Avalos et al. |
| 2006/0078128 A1 | 4/2006 | Meeusen |

OTHER PUBLICATIONS

Faller et al., "Technical Advances in Digital Audio Radio Broadcasting", Proceedings of the IEEE, vol. 90, No. 8, Aug. 2002.

* cited by examiner

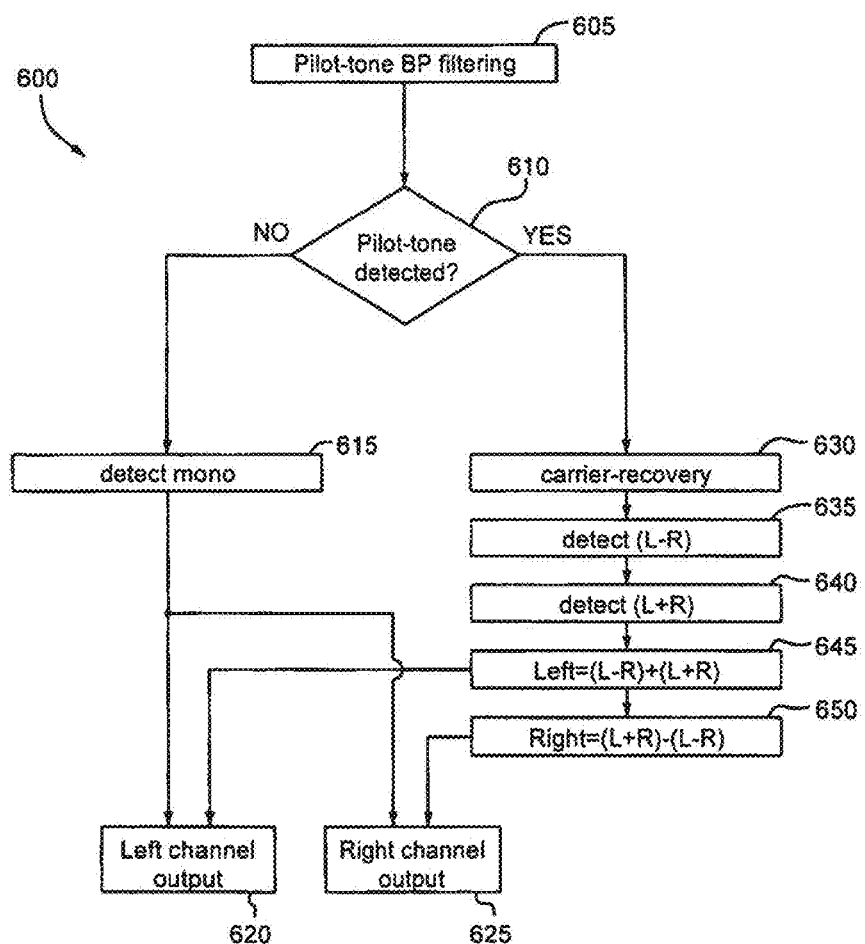

DIGITAL FM STEREO RECEIVER ARCHITECTURE

CROSS REFERENCE TO RELATED APPLICATIONS

This application is a continuation of U.S. patent application Ser. No. 12/170,224, filed Jul. 9, 2008, now U.S. Pat. No. 8,406,717, which is a continuation of U.S. patent application Ser. No. 10/819,649, filed Apr. 6, 2004, now U.S. Pat. No. 7,406,302, which is related to and claims priority to U.S. Provisional Application Ser. No. 60/529,656, filed Dec. 15, 2003 and U.S. Provisional Application Ser. No. 60/531,302, filed Dec. 18, 2003, all of which are hereby incorporated by reference.

TECHNICAL FIELD

This disclosure relates to digital techniques for FM stereo reception.

BACKGROUND

Public broadcast of radio is an important source of information and entertainment for people all over the world. The transmission of radio programs is based on analog technology, typically using amplitude modulation (AM), frequency modulation (FM), and stereophonic FM (also referred to as FM stereo). In an analog FM system, an analog signal may be encoded into a carrier wave by variation of its instantaneous frequency in accordance with the input analog signal.

FM stereo was introduced to create a more natural listening experience. Rather than a single signal including all of the audio information, stereo transmission involves separate left (L) and right (R) signals. The received and processed L and R signals are sent to different speakers, reproducing (at least partially) the spatial location of the source of a sound.

There are two systems for transmission of FM stereo defined by the International Telecommunications Union (ITU) the stereophonic multiplex signal system and the pilot tone system. In the pilot tone system (according to the ITU standard), suppressed-carrier amplitude modulation is used to modulate stereophonic information onto a higher frequency, and that information can be combined with mono-compatible information in the baseband to form a composite signal that is then frequency modulated to the appropriate program channel. To detect the stereo signal, the carrier that modulates the stereophonic information needs to be recovered.

SUMMARY

Systems and techniques described herein provide for digital processing of FM mono and stereo signals.

Systems and techniques for digital processing of FM stereo signals are described. In general, in one aspect, a receiver system may include an input to receive a signal such as a stereo signal or a mono signal. A stereo detector may produce an output based on whether the received signal is a stereo signal or a mono signal.

A carrier recovery module may recover a carrier signal based on the received signal. The system may include a multiplexer and a digital signal processor in communication with the multiplexer. The output of the multiplier may be based on whether the received signal is a stereo signal or a mono signal.

In some implementations, the multiplexer may be omitted. In some implementations, the system may include multiple digital signal processors; for example, the system may include a digital signal processor to process a left plus right signal and another digital signal processor to process a difference signal.

The digital signal processor may include a filter, which may include at least one of a low pass filter and a notch filter. The digital signal processor may further include a sub-sampling module. The digital signal processor may further include a de-emphasis module.

The system may further include a left/right processor to generate separate left and right signals. The separate left and right signals may be separate left and right bitstreams based on an output signal from a digital signal processor.

In general, in another aspect, a receiver system includes an input means for receiving a digital signal based on a mono signal or a stereo signal. The system may include stereo detection means for producing a stereo detection output. The system may include carrier recovery means for recovering a carrier signal based on the digital signal. The system may include multiplexing means for Producing an output based on receiving a mono signal or a stereo signal. The signal may include a digital signal processor.

In general, in another aspect, a method may include determining whether a received FM signal is based on mono transmission or stereo transmission. Determining whether the received FM signal is based on mono transmission or stereo transmission may include filtering the received FM signal, and may further include comparing a parameter based on an amplitude of the filtered signal with a reference amount.

If the received FM signal is based on stereo transmission, the method may further include recovering a carrier signal based on the received FM signal. The method may include generating a digital signal indicative of a difference between left and right signals based on the received FM signal using the carrier signal.

The method may further include generating a digital left plus right signal based on the received FM signal, and processing the digital difference signal and the digital left plus right signal. The method may further include generating a digital left signal and a digital right signal. Processing the difference signal and the left plus right signal may include at least one of filtering the signal, sub-sampling the signal, and de-emphasizing the signal.

In general, in another aspect, a computer program, which is stored on a non-transitory computer readable medium (e.g., a hard disk drive or a solid state memory device), is operable to cause one or more machines to perform operations including determining whether the received FM signal is based on mono or stereo transmission. Determining whether the received FM signal is based on mono transmission or stereo transmission may include filtering the received FM signal, and may further include comparing a parameter based on an amplitude of the filtered signal with a reference amount.

If the received. FM signal is based on stereo transmission, the operations may further include recovering a carrier signal based on the received FM signal. The operations may include generating a digital signal indicative of a difference between left and right signals based on the received FM signal using the carrier signal.

The operations may further include generating a digital left plus right signal based on the received FM signal, and processing the digital difference signal and the digital left plus right signal. The operations may further include generating a digital left signal and a digital right signal. Processing the difference signal and the left plus right signal may include at least one of filtering the signal, sub-sampling the signal, and de-emphasizing the signal.

In general, in another aspect, a receiver system includes an input to receive a digital signal. The system includes a carrier recovery module configured to recover a carrier signal, and a digital signal processor configured to filter the digital signal. The digital signal processor may be further configured to sub-sample the digital signal. The digital signal processor may be further configured to de-emphasize the digital signal.

In general, in another aspect, a receiver system includes an input means to receive a digital signal. The system includes a carrier recovery means for recovering a carrier signal, and a digital signal processing means for filtering the digital signal. The digital signal processing means may be further be for sub-sampling the digital signal. The digital signal processing means may be further for de-emphasizing the digital signal.

The details of one or more implementations are set forth in the accompanying drawings and the description below. Other features and advantages will be apparent from the description and drawings, and from the claims.

DESCRIPTION OP DRAWINGS

FIG. 6 shows an implementation of a control sequence that may be used with a receiver system such as that shown in FIG. 5.

Like reference symbols in the various drawings indicate like elements.

DETAILED DESCRIPTION

Figure 1:
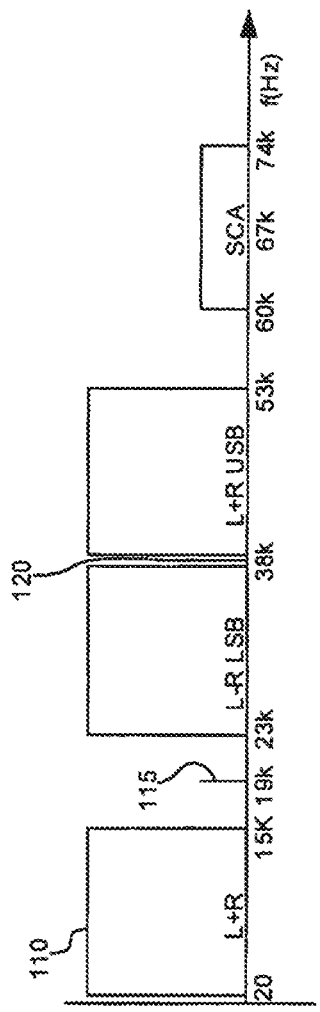
FIG. 1 is a conceptual FM stereo transmission spectrum.

As noted above, a pilot tone FM stereo system uses frequency modulation for a frequency division multiplexed baseband signal having stereophonic signal and a pilot tone. FIG. 1 shows a conceptual spectrum for FM stereo transmission. According to the ITU specification, a pilot tone system multiplexes the left and right audio signal channels to create a mono-compatible signal that is equal to the sum of the left and right channels (L+R). The mono-compatible signal is transmitted in the baseband 110.

The difference of the left and right channels (referred to as L−R herein; however the R−L may be used) is modulated using suppressed-carrier amplitude modulation with a carrier frequency 120 of 38 kHz. A 19 kHz reference signal, which is referred to as a pilot tone 115, is transmitted as well. Although not discussed herein, there are optional auxiliary data transmission channels such as the Subsidiary Communications Authorization (SCA) channel that are generally transmitted at lower power and higher frequencies (e.g., beyond 53 kHz).

Note also that although the currently used pilot tone and carrier frequencies (19 kHz and 38 kHz, respectively) are discussed herein, the current systems and techniques may be applied for frequencies different than those in current use.

Both the sum and difference signals may be pre-emphasized according to the ITU specification. The L+R, L−R, and the pilot signals form a multiplexed signal that is then frequency modulated to the desired carrier frequency and transmitted. At the receiver, the 38 kHz carrier needs to be recovered using 19 kHz pilot reference signal in order to detect the difference signal.

Figure 2:
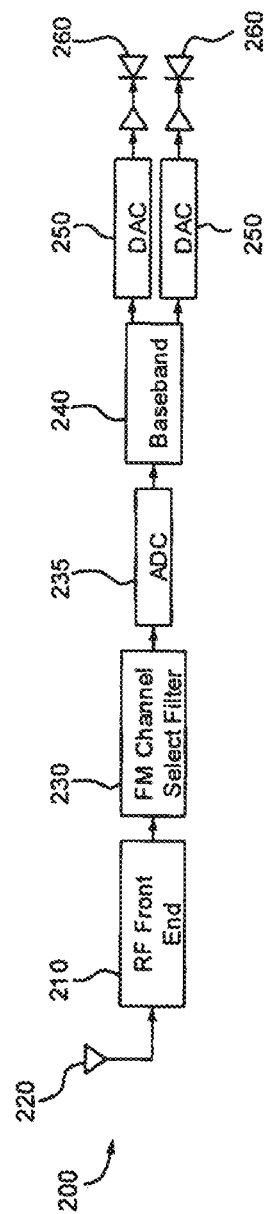
FIG. 2 is a functional block diagram of a digital implementation of an FM stereo receiver.

FIG. 2 shows a functional block diagram of a digital implementation of art FM receiver 200. A radio frequency (RF) analog front-end 210 receives an FM signal from an antenna 220 and transmits an analog signal to an FM channel select filter 230, which filters out the desired program channel. An analog-to-digital converter (ADC) 235 converts the resulting analog signal to a digital signal. Note that the received analog signal may be converted to a digital signal prior to selecting the desired channel, in some implementations.

The digital signal is demodulated using a digital baseband processor 240, described in more detail below. One or more digital to analog converters (DACs) 250 may then be used to transform the left and right channel bitstreams to the analog domain so that they may be played (e.g., the left and right analog signals may be used to drive speakers 260).

Figure 3:
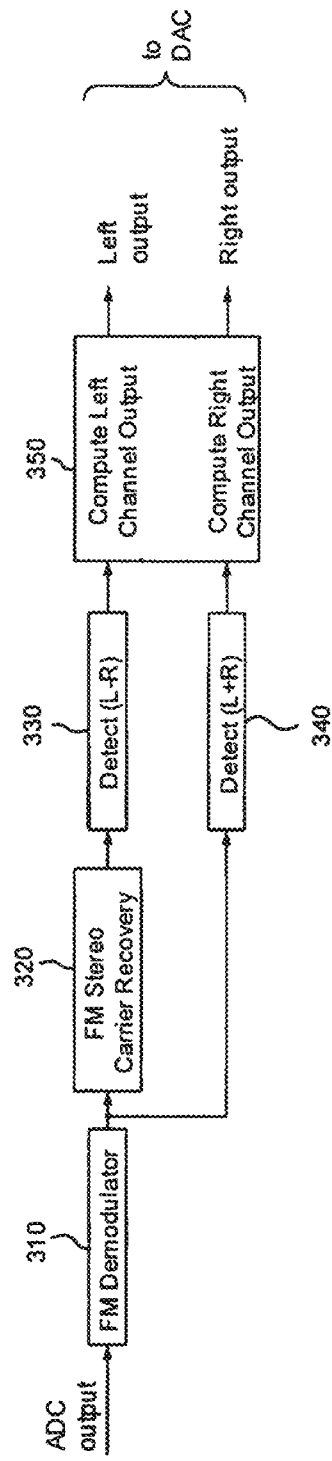
FIG. 3 is a functional block diagram of an implementation of a digital FM stereo baseband processor.

A functional block diagram of an implementation of a digital FM stereo baseband processor such as processor 240 is shown in FIG. 3. An FM demodulator 310 may receive the output bitstream of an ADC such as ADC 235 of FIG. 2 Demodulator 310 extracts the multiplexed L+R. L−R, and the reference pilot tone.

The 38 kHz carrier may be recovered using a carrier recovery module 320. Carrier recovery module 320 uses the pilot tone to recover the 38 kHz carrier in order to detect the L−R bitstream. A detector 330 may implement (for example) bandpass and/or low pass filtering to detect the L−R bitstream.

A detector 340 may implement (for example) low pass filtering to extract the L+R bitstream. Finally, the L+R and L−R bitstreams can be combined appropriately using a combiner 350 to obtain the bitstreams corresponding to the left and right channels. The output of combiner 350 may be provided to one or more DACs, such as DAC 250 of FIG. 2.

Figure 4:
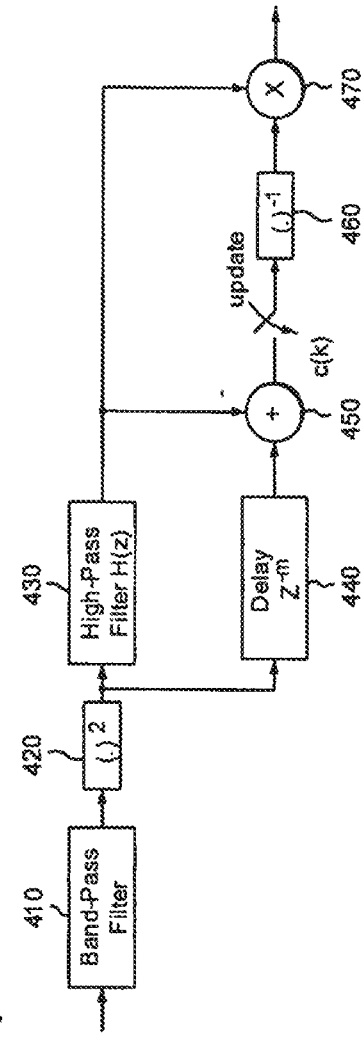
FIG. 4 shows a functional block diagram of an implementation of a carrier recovery module.

FIG. 4 shows an implementation of a carrier recovery module such as carrier recovery module 320 of FIG. 3. A bandpass filter 410 may be used to obtain the 19 kHz pilot tone. A multiplier such as a squaring module 420 may be applied to the filtered signal. The output of squaring module 420 includes both a component at 38 kHz (twice the input signal frequency) and a DC component, as Equation (1) illustrates:

$$\cos^2\alpha = \frac{1}{2}(1 + \cos 2\alpha) \qquad \text{Equation (1)}$$

A high pass filter 430 may be used to filter out the carrier signal at 38 kHz any possible implementations of high pass filters H(Z) may be used to recover the carrier signal.

Squaring (or other multiplication of) the input signal allows for the recovery of a signal at 38 kHz based on the 19 kHz pilot tone. However, magnitude of the L+R and L−R bitstreams may also need to be normalized by determining a scaling factor for the squared input signal. The bitstreams may need to be normalized because, e.g., the transmitter generally scales the magnitude of the pilot tone to a lower power level than the transmitted audio signal.

Furthermore, transmission channel effects such as a Doppler effect resulting from a moving transmitter and/or receiver) and the transceiver hardware implementation may cause the scaling factor (which may be denoted as a(t)) to change with time. Squaring the pilot tone with a scaling factor can be represented as shown in Equation (2)

$$a^2(t)\cos^2(2\pi f_p t) = \frac{a^2(t)}{2}(1 + \cos 2\pi(2f_p)t) \quad \text{Equation (2)}$$

where $f_p$=19 kHz. To estimate the sampled scaling factor $$\frac{a^2(t)}{2},$$

denoted as c(k) in FIG. 4, a low-complexity low-pass filter can be implemented using the combination of the high pass filter 430 (denoted as H(Z) in FIG. 4) and a delay element 440 (denoted as $Z^{-m}$ FIG. 4, where m=n/2 and n is the order of the filter H(Z)).

The output of filter 430 may be subtracted from the output of delay element 440 using a summer 450. The output of summer 450 is c(k), which may then be inverted using an inverter 460. The output of filter 430 can then be multiplied by 1/c(k) to obtain the recovered and normalized 38 kHz carrier, using a multiplier 470.

As noted above, a(t) (or alternatively c(k)) may vary over time. Accordingly, in some implementations, the scaling factor may be determined a single time, while in others it is updated at least once, updated periodically, or updated generally continuously. For example, if a(t) is changing slowly over time, the computation of c(k) may be done occasionally or periodically. However, if a(t) is changing appreciably, it may be advantageous to update a(t) continuously.

Other implementations of a carrier recovery module may be used. For example, depending on the overall FM stereo receiver architecture design, the correction factor may be passed onto the part of a baseband processor where the magnitude of the L+R and L−R bitstreams are normalized. In an example of such an implementation, the L+R bitstream may be multiplied by c(k) in order to avoid the division operations required to compute 1/c(k).

Figure 5:
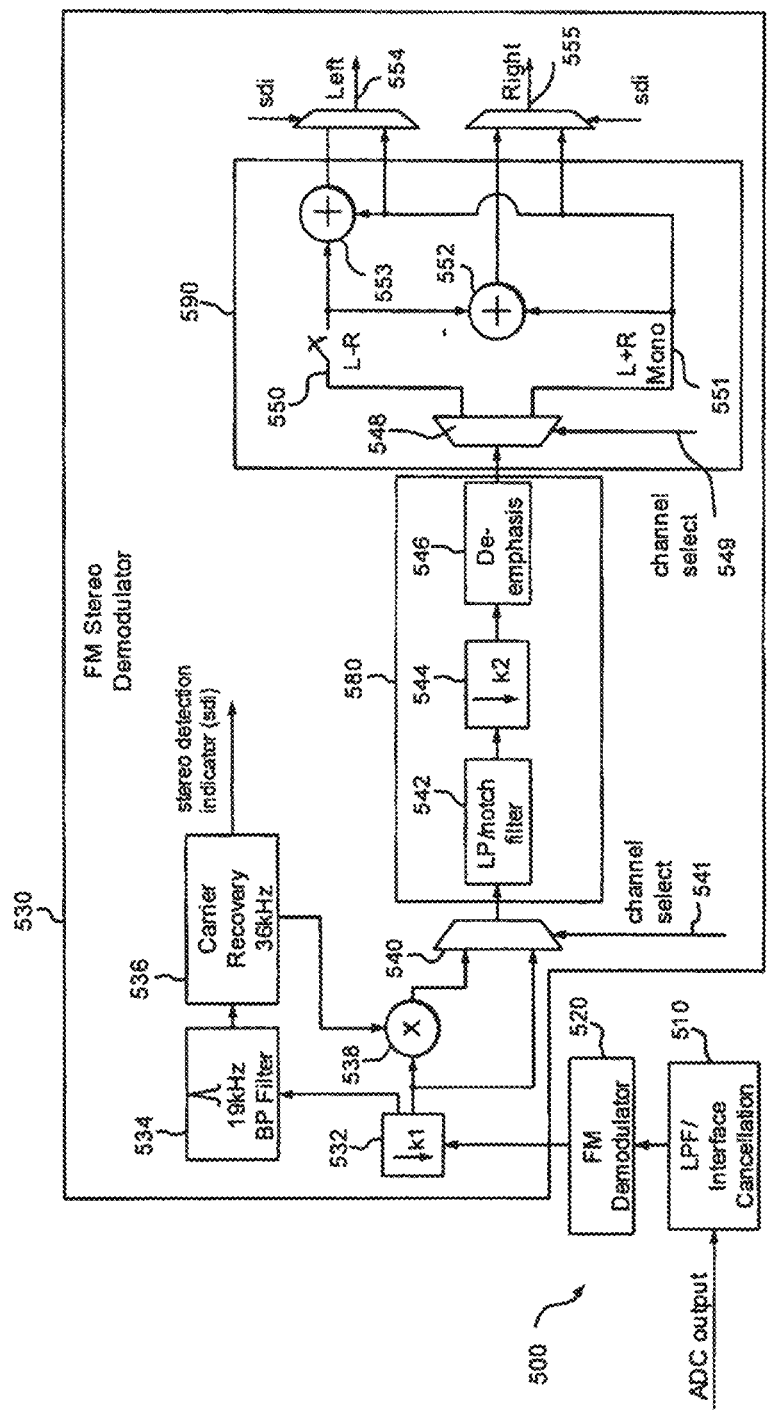
FIG. 5 shows an implementation of an FM stereo receiver system.

Digital FM stereo signal processing may be performed using different receiver architecture implementations. FIG. 5 shows an implementation of an FM stereo receiver system 500. System 500 may receive the output of one or more ADCs such as converter 235 of FIG. 2. A filter 510 may be provided in system 500 for additional channel selection and filtering, to reduce adjacent channel interference.

The output of filter 510 may be provided to a demodulator 520. Demodulator 520 may perform conventional digital FM demodulation. For example, demodulator 520 may obtain the demodulated multiplexed baseband signal by computing the differential of the angle of the complex received signal from the ADC.

The output of demodulator 520 may be provided to an FM stereo demodulator system 530 for recovery of a mono signal (for mono transmission) or left and right signals (for stereo transmission). In some cases, it may advantageous to downsample the signal received from the ADC. For example, depending on the particular FM demodulation algorithm and sampling rate used, the signal may be down-sampled by a factor denoted k1 using a down sampler 532, to reduce the complexity required for subsequent FM stereo demodulation.

In some implementations of system 530, the system may determine if the demodulated signal includes a pilot tone. For example, the demodulated signal may be provided to a bandpass filter 534, and the output of bandpass filter 534 at 19 kHz may be subsequently detected. If the detected magnitude is greater than a threshold magnitude, the system determines that the signal includes a pilot tone and thus detects FM stereo transmission. If the magnitude is less than the threshold magnitude, the system detects mono transmission. A stereo detection indicator (SDI) may be set accordingly, to indicate stereo or mono transmission.

For stereo transmission, a carrier recovery module 536 may recover the 38 kHz carrier so that the L−R bitstream can be down-converted to baseband and subsequently detected. The output from carrier recovery module 536 and from downsampler 532 (or alternately, FM demodulator 520) may be multiplied using a multiplier 538.

The current inventor realized that a stereo receiver architecture with reduced complexity may be provided by using a common processing module for a mono signal and for both L+R and L−R signals. Alternatively, to increase processing speed, more than one processing module may be provided so that at least some of the signals may be processed in parallel.

For example, system 500 may include a processor 580 for processing mono, L−R, and L−R signals. A multiplexer 540 may receive the input from multiplier 538 and from downsampler 532. A channel select input 541 determines whether the L−R bitstream or the L+R bitstream (or mono bitstream, for mono transmission) is processed in processor 580.

For detecting both the mono and L+R transmissions, the FM demodulated bitstream is first passed through a filter 542 which may implement both low pass filtering and notch filtering, where a notch at 19 kHz allows the mono or L+R signal to be extracted while rejecting interference from the pilot tone.

The filtered bitstream may be sub-sampled by a factor of k2 using a sub-sampler 544. The bitstream may then be transmitted to a de-emphasis module 546. De-emphasis module 546 may include a filter denoted by G(z), where G(z) can be derived as shown in Equation (3)

$$G(z) = \frac{1-c}{1-cz^{-1}} \quad \text{Equation (3)}$$

where $c=e^{1/\tau f}$, and where τ is typically equal to 50 μsec for Europe or 75 μsec for the United States.

The output of de-emphasis module 546 is input to a multiplexer 548. For mono transmission, a channel select input 549 (which may be based on the stereo detection indicator) sends the input signal of multiplexer 548 to both L output 554 and R output 555 via output 551 of multiplexer 548. For stereo transmission, multiplexer 548 sends the input signal to output 551 to be combined with an L−R signal as described below.

For detection of the L−R signal, the output of multiplexer 540 is the input from multiplier 538. The output of multiplexer 540 may be processed by processor 580 in the same manner as described above for processing the L+R or mono signals. The L−R signal is transmitted by multiplexer 548 on output 550 to be combined with an L+R signal.

The L+R and L−R signals are combined as follows. To obtain the R bitstream, the L−R signal is inverted and added to the L+R signal in a summer 552. To obtain the L bitstream, the L−R and L+R signals are added using a summer 553. The L and R bitstreams may then be output via left output 554 and right output 555, converted to analog signals and used to drive separate speakers (not shown).

FIG. 6 is a flow chart illustrating an implementation of a control sequence that may be used with a receiver system such as system 500 of FIG. 5. An input signal may be filtered (605), for example, using a 19 kHz bandpass filter. The output of the filter may be used to detect a pilot tone (610). If a pilot tone is not detected, mono transmission is detected (615). The mono signal is transmitted to both a left channel output (620) and a right channel output (625).

If a pilot tone is detected, carrier recovery may be performed (630). The recovered carrier may be used to detect the L−R bitstream (635). The L+R bitstream may be detected (640). The L+R and L−R bitstreams may be combined to generate a L bitstream (645) that is transmitted to the left channel output (620), as well as to generate a R bitstream (650) that is transmitted to the right channel output (625).

A number of implementations have been described. Nevertheless, it will be understood that various modifications may be made without departing from the spirit and scope of the invention. For example, some functionality described above and illustrated in the figures may be implemented using hardware, using software, or using a combination of hardware and software. Additionally, actions described in a certain order may in some cases be performed in a different order. For example, analog to digital conversion and/or digital to analog conversion may be performed at a different place in the signal processing than described. Accordingly, other implementations are within the scope of the following claims.

What is claimed is:

1. A method comprising:
   determining whether a received digital signal is a mono signal or a stereo signal;
   using a digital signal processor to process the received digital signal based on stereo transmission when the received digital signal is determined to be a stereo signal; and
   using the same digital signal processor to process the received digital signal based on mono transmission when the received digital signal is determined to be a mono signal.

2. The method of claim 1, comprising filtering and sub-sampling the received digital signal using the digital signal processor.

3. The method of claim 1, comprising filtering, sub-sampling and de-emphasizing the received digital signal using the digital signal processor.

4. The method of claim 1, comprising:
   using a left/right processor, which is coupled with an output of the digital signal processor, to generate a separate left bitstream and right bitstream based on an output signal from the digital signal processor when the received digital signal is determined to be a stereo signal; and
   bypassing the left/right processor when the received digital signal is determined to be a mono signal.

5. The method of claim 4, wherein the left/right processor comprises two summers coupled with an input of the left/right processor.

6. The method of claim 1, wherein using the digital signal processor to process the received digital signal based on stereo transmission comprises using two instances of the same digital signal processor to handle L+R and L−R processing in parallel.

7. The method of claim 1, wherein determining whether the received digital signal is a mono signal or a stereo signal comprises filtering the received digital signal to produce a filtered signal.

8. The method of claim 7, wherein determining whether the received digital signal is a mono signal or a stereo signal comprises comparing an amplitude of the filtered signal with a reference amount.

9. The method of claim 1, comprising:
   down-sampling the received digital signal before determining whether the received digital signal is a mono signal or a stereo signal;
   providing the down-sampled digital signal to the digital signal processor when the down-sampled digital signal is determined to be a mono signal; and
   when the down-sampled digital signal is determined to be a stereo signal, recovering a carrier signal based on the down-sampled digital signal and providing to the digital signal processor a digital signal generated by multiplication with the carrier signal.

10. A method comprising:
    receiving a digital signal based on a received mono signal or a received stereo signal;
    bandpass filtering the received digital signal to obtain a pilot signal;
    detecting the pilot signal when a magnitude of the bandpass filtered signal is greater than a predetermined threshold; and
    filtering and processing the received digital signal based on stereo transmission, including recovering a carrier signal based on the digital signal, when the pilot signal is detected.

11. The method of claim 10, comprising filtering and processing the received digital signal based on mono transmission when the pilot signal is not detected.

12. The method of claim 10, wherein recovering the carrier signal based on the digital signal comprises using the pilot signal detected from the bandpass filtering.

13. A non-transitory computer readable medium storing a computer program configured to cause a frequency modulation (FM) stereo demodulator system to perform operations comprising:
    determining whether a received digital signal is a mono signal or a stereo signal;
    using a digital signal processor to process the received digital signal based on stereo transmission when the received digital signal is determined to be a stereo signal; and
    using the same digital signal processor to process the received digital signal based on mono transmission when the received digital signal is determined to be a mono signal.

14. The non-transitory computer readable medium of claim 13,
    the operations comprising filtering and sub-sampling the received digital signal using the digital signal processor.

15. The non-transitory computer readable medium of claim 13,
    the operations comprising filtering, sub-sampling and de-emphasizing the received digital signal using the digital signal processor.

16. The non-transitory computer readable medium of claim 13, the operations comprising:
    using a left/right processor to generate a separate left bitstream and right bitstream based on an output signal from the digital signal processor when the received digital signal is determined to be a stereo signal.

17. The non-transitory computer readable medium of claim 13,
    wherein using the digital signal processor to process the received digital signal based on stereo transmission comprises using two instances of the same digital signal processor to handle L+R and L−R processing in parallel.

18. The non-transitory computer readable medium of claim 13,
wherein determining whether the received digital signal is a mono signal or a stereo signal comprises filtering the received digital signal to produce a filtered signal.

19. The non-transitory computer readable medium of claim 18,
wherein determining whether the received digital signal is a mono signal or a stereo signal comprises comparing an amplitude of the filtered signal with a reference amount.

20. The non-transitory computer readable medium of claim 13, the operations comprising:
down-sampling the received digital signal before determining whether the received digital signal is a mono signal or a stereo signal;
providing the down-sampled digital signal to the digital signal processor when the down-sampled digital signal is determined to be a mono signal; and
when the down-sampled digital signal is determined to be a stereo signal, recovering a carrier signal based on the down-sampled digital signal and providing to the digital signal processor a digital signal generated by multiplication with the carrier signal.

21. A non-transitory computer readable medium storing a computer program configured to cause a frequency modulation (FM) stereo demodulator system to perform operations comprising:
receiving a digital signal based on a received mono signal or a received stereo signal;
bandpass filtering the received digital signal to obtain a pilot signal;
detecting the pilot signal when a magnitude of the bandpass filtered signal is greater than a predetermined threshold; and
filtering and processing the received digital signal based on stereo transmission, including recovering a carrier signal based on the digital signal, when the pilot signal is detected.

22. The non-transitory computer readable medium of claim 21, wherein the operations comprise filtering and processing the received digital signal based on mono transmission when the pilot signal is not detected.

23. The non-transitory computer readable medium of claim 21, wherein recovering the carrier signal based on the digital signal comprises using the pilot signal detected from the bandpass filtering.

* * * * *